United States Patent Office 3,487,200
Patented Dec. 30, 1969

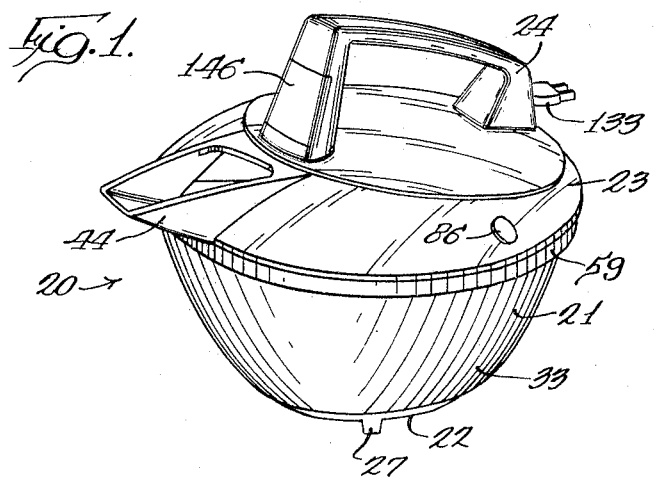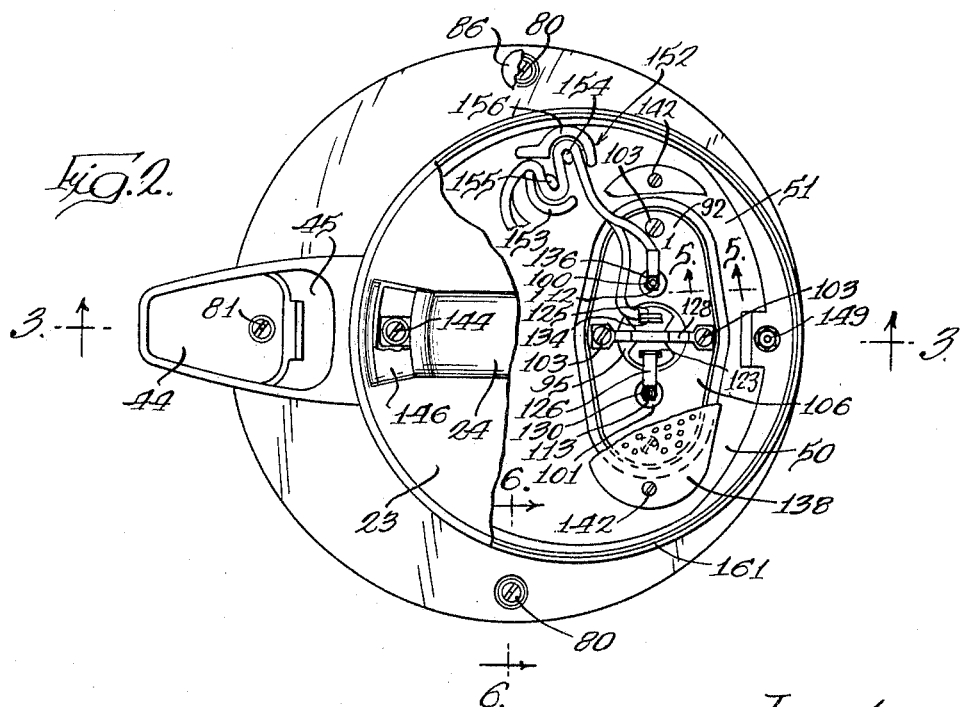

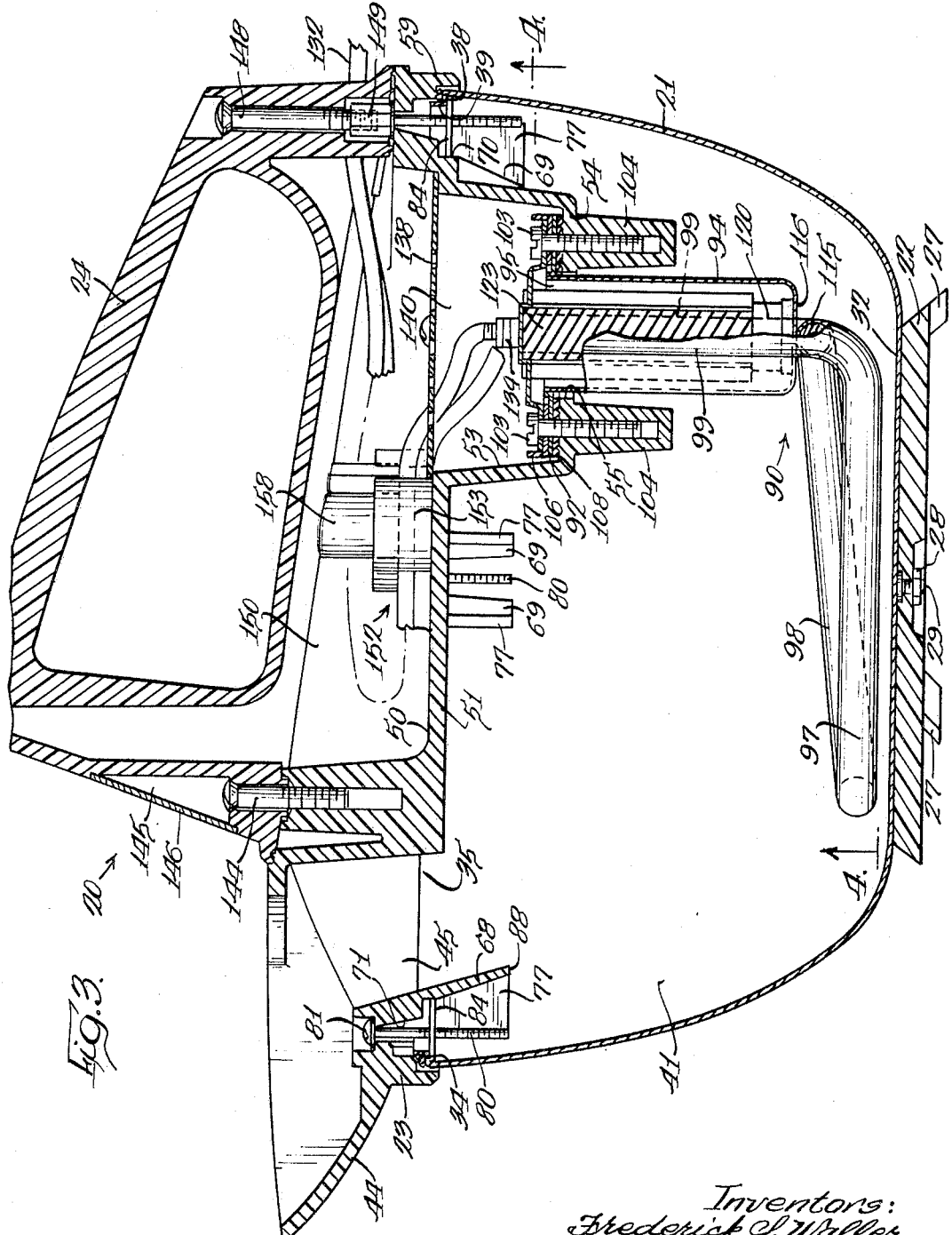

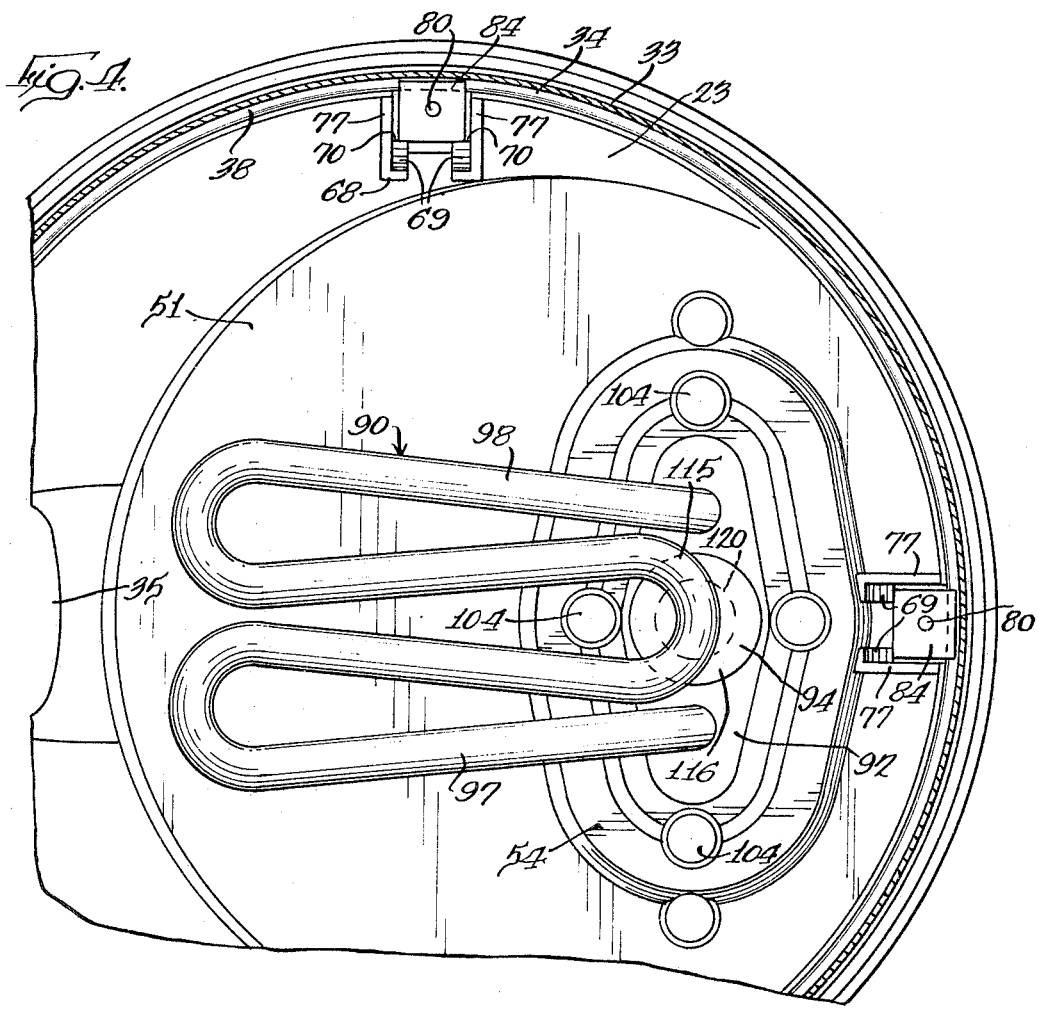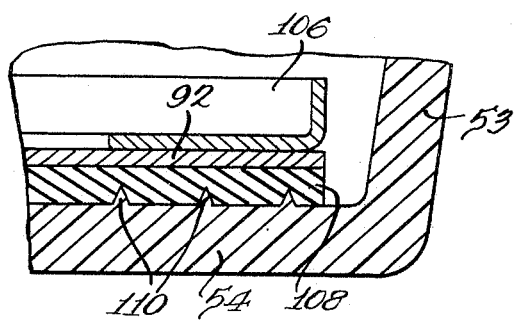

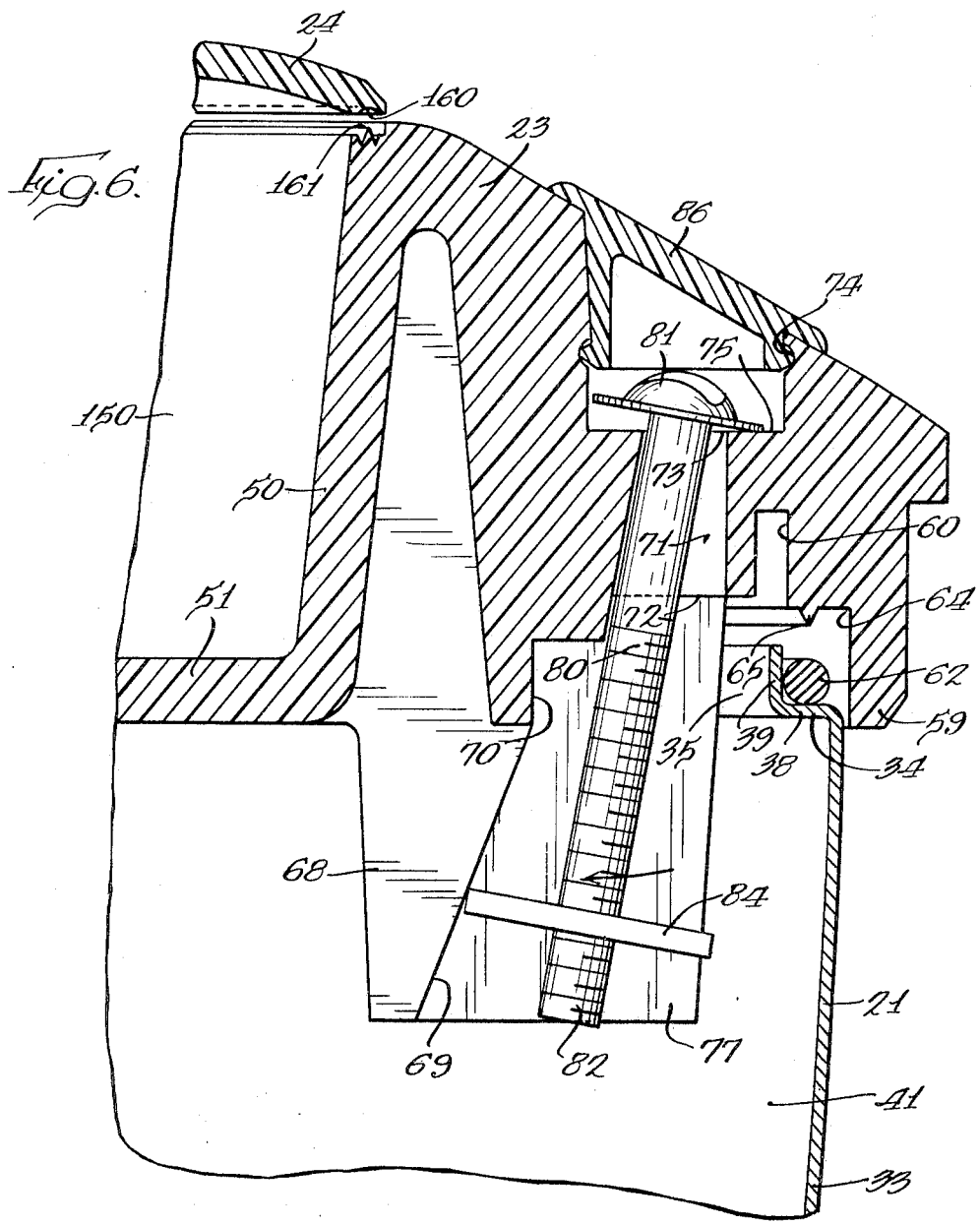

3,487,200
ELECTRIC KETTLE
Frederick S. Waller, Caledon, Ontario, Canada, and Vello Laama, Lombard, Ill., assignors to Sunbeam Corporation, Chicago, Ill., a corporation of Illinois
Filed Nov. 3, 1967, Ser. No. 680,439
Int. Cl. F27d 11/00
U.S. Cl. 219—437                    19 Claims

ABSTRACT OF THE DISCLOSURE

An electric kettle having an electric heating assembly for heating the fluid contained within the kettle vessel. To facilitate the repair and servicing of this unit, the electric heating assembly is removably secured to the kettle and the kettle cover does not need to be removed in order to replace the heating assembly. The electric kettle is easily assembled together and disassembled, and nearly all of the components can be secured in place by employing only an expensive tool, such as a screwdriver or the like, including the locking and sealing of the cover to the kettle vessel. The heating assembly includes a thermostat disposed within a well and a portion of the electric heater is in good heat conducting engagement with the well.

BACKGROUND OF THE INVENTION

The present invention relates to fluid heaters and more particularly to electric kettles for heating water therein by means of an electric heating assembly which is positioned to be immersed in the water.

Electric kettles for home use are popular in those countries where the people have developed a taste for tea and, consequently, there is a desire to have available on relatively short notice a small quantity of very hot water. Inasmuch as most homes have a cooking range in the kitchen which is capable of heating water, the success of a special appliance, having for its sole purpose the heating of water, is dependent upon its inexpensive cost, reliability in operation and simple maintence. Furthermore, the volume of production for this special purpose appliance is not great enough in most instances to justify and make economically feasible the expenditure of large sums of money necessary to automate its production. Therefore, it is highly desirable to manufacture this appliance with a minimum of tooling cost and yet have the unit easily assemblable for reliable operation and inexpensive servicing.

In an electric kettle where basically there are no moving parts, the main repair required is the replacement of the heating assembly which after long service may burn out. Accordingly, the hating assembly should be easily removed from the kettle and the new assembly readily assembled thereto so that replacement of the assembly can be accomplished with a minimum of effort and money expended.

With use in hard water areas, it is sometimes desirable to disassemble the kettle so that the user may have access to the interior of the kettle in order to clean by scouring or some other suitable cleaning procedure the inside surface of the kettle vessel and, possibly, to clean the immersible heater to remove mineral deposits which reduce the thermal transfer between the heater and the water. Thus, the electric kettle should be easily disassemblable by the user employing the tools which are normally found within the home.

Since the electric kettle is frequently used in the home on the kitchen counter and since the kitchen counter is normally overcrowded with appliances which reduce the work space available, it is desirable for the kettle to be provided with means for eliminating the excess length of it exposed electric power cord. Naturally, the cord must be reasonably long in order to be used at various distances from the nearest power outlet which distance differs from home to home. Once the most desirable length cord has been determined for the appliance for a particular situation, the kettle should be capable of storing the excess cord so that the cord consumes little valuable counter work space and the tendency of the cord to becoming entangled with other items is reduced.

SUMMARY OF THE INVENTION

The invention relates to an electric kettle having an upwardly open, cup-shaped vessel and having fastening means securing a cover to the top of the vessel so that the cover closes the vessel opening to define a vessel chamber therebetween for holding a fluid therein. The cover forms a control chamber extending downwardly into the vessel chamber. To heat the fluid within the kettle, an electric heating assembly is removably attached to the cover within the control chamber and depends into the vessel chamber to a point near the bottom thereof. The heating assembly is removable from the kettle without necessitating the removal of the cover from the kettle.

In order to control the operation of the kettle, the heating assembly is provided with a thermostat control which is in good thermal conducting relationship with a portion of the heating assembly heater.

Cam means is provided on the cover and is operated by the fastening means for assembling and disassembling the cover to the vessel. In addition, the cam means is used to squeeze a gasket between the cover and vessel for establishing a water seal therebetween.

Furthermore, the invention contemplates a cord storage chamber formed between the cover and a handle member so that the excess length of cord can be easily stored within the kettle.

Accordingly, it is an object of the present invention to provide an electric kettle which is easily assembled and disassembled with a minimum of tooling required and which is inexpensively manufactured.

Another object of the invention is to provide an electric kettle having a heating element assembly which can be easily replaced.

Still a further object of the present invention is to provide an electric kettle with an electric heater which is in intimate heat transfer relationship with a control thermostat.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWING

For a better understanding of the present invention, reference may be had to the accompanying drawings in which:

FIG. 1 is a perspective view of an electric kettle embodying the invention with most of the electric power cord stored within the kettle;

FIG. 2 is a top plan view thereof with portions of the handle member, screw concealing button and electric power cord broken away and with one screw concealing button completely removed;

FIG. 3 is an enlarged sectional view taken substantially along line 3—3 of FIG. 2 with a portion of the handle and cord broken away and assuming that FIG. 2 discloses the complete unit;

FIG. 4 is a fragmentary bottom sectional view taken substantially along line 4—4 of FIG. 3, assuming that FIG. 3 shows the complete unit;

FIG. 5 is an enlarged fragmentary sectional view taken substantially along line 5—5 of FIG. 2; and FIG. 6 is a somewhat exploded, enlarged fragmentary sectional view taken substantially along line 6—6 of FIG. 2 with the screw concealing button shown in its proper assembled position and assuming that FIG. 2 depicts the complete unit.

DESCRIPTION OF THE PREFERRED EMBODIMENT

Referring to the drawing, there is shown a portable electric kettle designated generally by the reference numeral 20 comprising a vessel 21 mounted on a base 22 and a cover 23 on top of the vessel 21 with a handle member 24 secured to the top of the cover 23.

Preferably, the base 22 is molded from a suitable plastic, such as polypropylene, and has a plurality of supporting feet 27 adapted to engage with a kitchen counter top or the like. As may be seen in FIG. 3, the base 22 is rigidly locked to the vessel 21 by means of a single nut 28 which is in threaded engagement with a vessel stud 29.

For holding and storing the liquid to be heated, the vessel 21 is provided and has a somewhat cup-shape configuration with a relatively flat bottom 32, curved side wall 33 and a rim 34 defining an upwardly facing opening 35. Preferably, the vessel 21 is fabricated from stainless steel sheet metal and the rim 34 is integrally formed by a rolling process or the like. For the sake of appearance, the outer surface of the vessel is preferably polished, and the inner surface is relatively smooth to facilitate the cleaning thereof. The vessel rim 34 is formed with an annular inwardly extending shelf 38 and an upwardly extending inner annular lip 39.

Enclosing the vessel opening 35 is cover 23 to define a vessel chamber 41 between the cover and vessel. Preferably, both the cover 23 and handle member 24 are molded from a suitable plastic material, such as polypropylene, which is resistant to the temperature and hot water vapor environment inherent with an electric kettle. Cover 23 has a somewhat circular configuration and is formed with an integral pouring spout 44 which forms a passageway 45 leading to the vessel chamber 41 so that fluid, such as water, may be either poured therefrom utilizing the spout 44 or may be added thereto. In addition, the cover 23 is formed with a recessed circular cord storage area 50 having a bottom wall 51 disposed immediately behind the pouring spout 44, and this area 50 in turn contains a recessed terminal and control area 53 extending downwardly into vessel chamber 41 and including a bottom wall 54 defining an elongated opening 55 providing access to the vessel chamber 41.

As may be conveniently seen in FIG. 6, cover 23 has a peripheral wall 59 which extends downwardly to embrance the upper end of the vessel curved side wall 33. It should be appreciated that FIG. 6 discloses the cover 23 in the act of being moved downwardly to engage vessel 21 so that these two components are spaced apart slightly. However, these parts are shown in their assembled state in FIG. 3. The vessel rim lip 39 is received within an annular groove 60. To facilitate a water tight seal between the cover 23 and the vessel 21, an O-ring gasket 62 is positioned on rim shelf 38 adjacent to the rim lip 39. As can be seen in FIG. 6, the cover 23 is formed with an annular horizontal surface 64 psitioned immediately above the vessel rim shelf 38. Furthermore, the cover annular surface 64 is provided with an annular V-shaped wedge 65 disposed to be in alignment with the center of the O-ring gasket 62. Therefore, when the cover 23 is assembled to the vessel 21, the vessel rim lip 39 extends into cover groove 60 giving support thereto and wedge 65 is forced downwardly into O-ring gasket 62 providing an effective water seal between the vessel and the cover.

For the purpose of releasibly locking the cover 23 to the vessel 21, the cover is provided with a plurality of spaced cam walls 68 having outwardly facing cam surfaces 69 which are angled upwardly and outwardly. At the top of each cam surface 69 is a vertical locking surface 70. Spaced above each locking surface 70 is a vertically extending tapered passageway 71 having a much larger lower opening 72 than an upper opening 73. The upper passageway opening 73 is located in a recess 74 having a substantially hoirzontal bottom surface 75. To lessen the need for a plastic material to form cover 23, cam walls 68 can be molded with the central portion cut out. As can be seen in FIGS. 3, 4 and 6, at each side of cam wall 68 is a vertically extending retaining wall 77. Extending through each of the passageways 71 is a screw 80 having a round slotted head 81 disposed to abut with recess bottom surface 75 and a threaded portion 82 which is in threaded engagement with a square nut 84. As may be seen in FIG. 6, as the cover 23 is placed onto vessel 21, the screw 80 can be pivoted inwardly so that square nut 84 is disposed so as not to come in engagement with rim 34. As soon as the nut 84 has passed beneath the rim 34, it can be pivoted downwardly so that the screw 80 is vertically disposed. It should be appreciated that passageway 71 has a larger lower end 72 to accommodate the pivotal movement of the screw 80. As depicted in FIG. 6, the screw 80 and nut 84 are pivoted inwardly so that the screw is resting against the inward portion of the lower passageway opening 72. Upon rotation of screw 80, the nut 84 is forced to move longitudinally along the screw threaded portion 82 since the vertical retaining walls 77 prevent the rotation of the nut. In the present arrangement, the opposed sides of square nut 84 are spaced a distance slightly less than the distance between vertical retaining walls 77. When the screw 80 is rotated in a direction to force the nut 84 upwardly, the nut engages against the cam surface 69 which forces it outwardly until it reaches the vertical locking surface 70 whereby the nut is forced to abut against the bottom of rim shelf 38. In this manner, the screw 80 and nut 84 are employed to securely lock the cover 23 to the vessel 21 and, in addition, provide a clamping force which assures that gasket 62 will establish a water seal between these two parts. A screw concealing button 86 is snapable into recess 74 to hide the screw 80 and also to prevent debris from lodging therein. When it is desired to remove the cover 23 from vessel 21, the screw 80 is rotated causing the nut 84 to move downwardly from engagement with vertical locking surface 70 until it engages with cam surface 69 permitting the nut to swing inwardly a distance sufficient so that it is no longer disposed to abut against rim 34 thereby releasing the cover from the vessel.

When fluid is placed in the vessel chamber 41, it is desirable that the chamber not be overfilled since such overfilling presents the possibility that the fluid upon being heated will bubble out due to the locking action through the spout passagewa y45. That is to say, if the fluid level is maintained below a maximum level, the boiling action and thermal expansion of the fluid will not be able to force fluid out of the spout. To aid the user in filling the vessel chamber 41 to the proper level, the cam wall 68 disposed immediately below the pouring spout 44 is extended downwardly to edge 88 which is disposed at the ideal maximum filling level. Thus, when the user wishes to fill the vessel chamber 41, water is poured into the chamber through the spout passageway 45 until the water level reaches edge 88. Therefore, the cover cam wall edge 88 acts as an effective water level gauge. It should be appreciated that edge 88 is easily viewable by the user through the pouring spout passageway 45. This location is particularly advantageous since during the filling operation, the user's attention is normally drawn to the passageway 45 to insure that the water is poured accurately therethrough.

Heat is supplied to the water within the chamber vessel 41 by a heating assembly generally designated by the reference numeral 90. The heating assembly 90 has a somewhat L-shaped configuration and comprises a horizontally disposed mounting plate 92, a cylindrically-shaped well 94 attached to plate 92 at its open end 95 so that the open end is facing upwardly and a sheathed heating element 97 having an essentially horizontally disposed leg portion 98 and a vertical leg portion 99 with ends 100 and 101 attached to plate 92 on opposite sides of well open end 95. Preferably, the mounting plate 92, well 94 and the tubular sheathing for heating element 97 is fabricated from a good heat conducting metallic material such as copper. The heating assembly 90 is attached to the terminal area bottom wall 54 by means of a plurality of screws 103 which extend through openings in the mounting plate 92 and are anchored in screw receiving bosses 104 which extend downwardly from wall 54 into vessel chamber 41. For establishing a water tight seal between the vessel chamber 41 and the terminal and cord area 53, a support plate 106 is positioned on top of mounting plate 92 and a rubber gasket 108 is disposed beneath the mounting plate 92 and on top of wall 54. To assist in preventing the passage of water through elongated opening 55, the bottom wall 54 is provided with a plurality of upstanding spaced annular ridges 110 as may be clearly seen in FIG. 5. Thus, when screws 103 are firmly tightened, the support plate 106 squeezes the mounting plate 92 against gasket 108 which abuts against wall 54 and upwardly spaced ridges 110 which encircle opening 55. Extending upwardly from heating element ends 100 and 101 are terminal rods 112 and 113, respectively, having threaded ends. These terminal rods 112 and 113 extend substantially the whole length of vertical leg portion 99 of heating element 97. Nichrome resistance wire extends through the heating element horizontal leg portion 98, and as a consequence, most of the heat generated by heating element 97 is done within horizontal leg portion 98. As can be seen in FIGS. 3 and 4, the heating element 97 has an L-shaped configuration in the profile and the horizontal leg portion 98 has a somewhat narrow W-shaped configuration when viewed in the plan. The horizontal leg portion 98 has a bight portion 115 approximately equidistant from its ends which in operation is normally the hottest section of the heating assembly and which is disposed immediately below and in engagement with the well 94 bottom wall 116 to assure a good heat conduction between the bight portion 115 and the well bottom wall 116. These two parts are preferably metallurgically bonded together by some process such as soldering. As can be seen in FIG. 3, the heating element horizontal leg portion 98 extends very close to the bottom of vessel chamber 41 so that it will be immersed in water until nearly all of the water has been withdrawn from the vessel chamber. It should be understood that even though the electric heating element is energized, the temperature thereof will not greatly increase until such time as it is no longer immersed in water. However, once the horizontal leg portion 98 is no longer submerged in water then the temperature thereof will greatly increase causing heat to be very rapidly conducted into the well 116 wall which in turn forces a very rapid temperature rise thereof.

To prevent the electric kettle 20 from overheating, there is provided a thermostatic switch control 120. Preferably, control 120 is of the bimetallic disc type which is inexpensive and commercially available. In this particular application, the control opens at approximately 250° F. and closes at 150° F. As can be seen in FIG. 3, the control 120 is disposed within well 94 so that it is against bottom wall 116 immediately above the connection between heating element bight portion 115 and wall 116. With this arrangement, the control 120 is in a position to quickly respond to any temperature rise of the heating element bight portion 115. Locating the control 120 within the well 94 is a vertically extending insulator 123 disposed immediately on top of the control 120. The insulator 123 is provided with spaced longitudinally extending openings through which control terminals 125 and 126 extend. A leaf spring 128 extends across the top of insulator 123 and is locked in place by screws 103 so that a biasing force is exerted downwardly on the insulator 123 which forces the thermostatic switch control 120 into intimate heat transmitting relationship with the well bottom wall 116. Thermosatic switch control terminal 126 extends through the insulator 123 and is bent so that it is held in electrical connection with heating terminal rod 113 by means of a suitable nut 130.

Supplying power to the heating assembly 90 is a relatively long electrical power cord 132 having a standard plug 133 at its outer end and its inner end connected to thermostatic switch control terminal 125 by a suitable space connector 134 and also connected to heating element terminal rod 112 by a nut 136. Thus, the electric kettle has a simple electric circuit wherein the thermostatic switch control 120 is in series with the sheathed heating element 97.

As may be seen in FIG. 3, the length of the power cord 132 permitted to enter within the terminal and cord area 53 is controlled by a notched perforated separator plate 138 which defines a terminal and cord chamber 140 between the plate 138 and the bottom wall 54. The separator plate 138 is held in position by a plurality of screws 142 and the cord 132 extends through the plate at a notch (not shown) in its periphery. Furthermore, the separating plate 138 is perforated so that the heat and moisture can escape from the chamber 140.

Disposed on top of cover 23 is the handle member 24 which is positioned so that the user may conveniently carry and pour the contents from the electric kettle. The handle member 24 is rigidly secured to the cover 23 by a screw 144 which extends downwardly from a recessed portion 145 adjacent to the spout 44. Enclosing the recessed portion 145 is a suitable escutcheon plate 146. The opposite end of the handle member is secured to the cover by means of screw 148 being in threaded engagement with an anchor bolt 149 which is used in place of on of the cover fastening screws 80. With the handle member 24 assembled to the cover 23, there is defined a cord storage chamber 150 which is disposed immediately above the cord storage bottom wall 51. It should be realized that cord storage chamber 150 is disposed vertically above terminal and cord chamber 140 and also above the vessel chamber 41.

Molded integrally with the cover 23 and extending upwardly from the cord storage chamber bottom wall 51 is cord strain relief 152 generally designated by reference numeral 152. The strain relief 152 is formed by C-shaped wall 153, upstanding projections 154 and 155 and hook-shaped wall 156. With this construction, when the power cord 132 is threaded through the strain relief 152 so that it passes between wall 153 and projection 155 and then passes between projection 154 and wall 156 so the cord must assume a generally S configuration, any external pull exerted upon the cord will be taken up by the strain relief 152 and, consequently, no external force is transmitted to the electrical connection between the cord and the heating assembly 90 and control 120. It is important to note that upon leaving the cord strain relief 152, the cord emerges between wall 153 and wall 156 so that the cord is directed tangentially to the periphery of the circular shaped cord storage chamber 150. Thus, as cord is fed into the cord storage chamber 150 through an opening (not shown) in the handle member, there is a natural tendency for the cord to loop around in a circular manner and thereby prevent the cord from becoming entangled within the cord storage chamber. To further lock the cord 132 within the strain relief 152, the handle member 24 is molded with a depending S-shaped wall 158 which nests within the cover strain relief 152 to wedge the cord in locking engagement. However, the S-shaped handle member wall 158 is not subjected to the pulling force exerted upon the power cord but merely is used to lock the power cord within the cover strain relief 152.

When the user is filling the electric kettle 20 by pouring water into spout passageway 45, some water may inadvertently spill over the handle member 24. In order to prevent any of this water from entering within the cord storage chamber 150, the handle member 24 is molded with a downwardly facing annular recess 160 near its periphery which is disposed to receive an inverted V-shaped annular edge 161 from the cover 23 to form a water barrier. This construction may be easily seen in FIG. 6. Thus, if water flows over the top of handle member 24, the interlocking handle member recess 160 and cover edge 161 prevents the entrance of water into the cord storage chamber 150.

The electric kettle hereinabove disclosed is easily manufactured and assembled, and it should be understood that nearly all of the components may be assembled together with the use of a simple tool, such as a screwdriver or the like having a blade for slotted screws and a socket to run down relatively small nuts. Not only can the kettle be easily assembled for manufacture, but it may also be readily disassembled for service and cleaning.

The heating element assembly 90 can readily be inserted into vessel chamber 41 either before or after the cover 23 has been secured to the vessel 21. The heating assembly 90 has a substantially L-shaped configuration in the profile with a relatively narrow horizontal leg portion 98 which is smaller than opening 55 and can be inserted through the elongated opening 55 in the bottom wall 54 by utilizing a slight pivoting motion as the assembly is inserted through the opening. After the heating assembly has been inserted downwardly through the opening 55, it can be quickly attached to the cover 23 by locking screws 103 in place. Thus, if the heating element 90 should become defective or be burned out, a replacement heating assembly may be substituted therefor by merely removing the handle member 24 and the separator plate 138 to thereby provide access to the heating assembly. Naturally, the heating assembly may be quickly removed by withdrawing screws 103, removing the power cord connector 134 from thermostatic switch control terminal 125 and removing the power cord from terminal rod 113 by removing nut 130. Thus, it is not necessary to remove the cover 23 from the vessel 21 when replacing the heating assembly 90.

In operation, the heating assembly 90 provides heat to the water contained within the vessel chamber 41. If the level of water within the chamber 41 should drop below or nearly below the heating element horizontal leg portion 98, the temperature rapidly increases and the heating element bight portion 115 which is soldered to the bottom of well wall 116 causing this wall to rapidly increase in temperature. Inasmuch as the thermostatic switch control 120 is disposed immediately above and is biased against the wall 116, it immediately opens as soon as its opening temperature of approximately 250° F. is reached. Consequently, the thermostatic switch control 120 is able to react very quickly to the temperature of hte heating element 97 by being disposed within a well 94 which is positioned rather close to the bottom of the vessel chamber 41. Therefore, with this compact arrangement, the terminal and cord chamber 140 as well as the well 94 is disposed within the confines of vessel chamber 41. Superimposed over these chambers is cord storage chamber 150 which permits the user to store the excess length of cord within the electric kettle and thereby conserve on the available work space.

While there has been shown and described one embodiment of the electric kettle invention, it will be obvious to those skilled in the art that changes and modifications may be made without departing from the invention and that it is intended by the appended claims to cover all such changes and modifications as fall within the true spirit and scope of the invention.

What is considered new and desired to be secured by Letters Patent of the United States is:

1. An electric kettle comprising an upwardly open cup-shaped vessel, cover means secured to said vessel and closing said vessel opening to define a vessel chamber therebetween for holding fluid, said vessel opening defined by an annular rim including an inwardly projecting shelf, said cover means being provided with integral cam means depending into said vessel chamber, nut means engageable with said cam means and supported by fastener means which passes through said cover means and is supported thereby, said fastener means disposed for raising and lowering said nut means whereby said cam means being disposed to force said nut means when being raised by said fastener means outwardly so that said nut means abuts against the bottom of said shelf for locking said cover means rigidly to said vessel and the lowering of said nut means releases said cover means from said vessel, said cover means forming a terminal chamber extending downwardly into said vessel chamber and an elongated opening at the bottom of said terminal chamber which opening extends completely through said cover means, an electric heating means removably attached to said cover means within said terminal chamber and extending for heating the fluid disposable within said vessel chamber, said heating means being removable from said kettle without removing said cover means from said vessel, thermostat control means for controlling the flow of electrical current to said heater means, said thermostat control means being in good thermal transfer relationship with a portion of said heater means, a handle member secured to the top of said cover means to define a cord storage chamber therebetween which is above said vessel and terminal chambers, an electric power cord means extending into said cord storage chamber and extending into said terminal chamber for making an electrical connection with said electric heating means.

2. An electric kettle comprising an upwardly open cup-shaped vessel, cover means secured to said vessel and closing said vessel opening to define a vessel chamber therebetween for holding fluid, said cover forming a terminal chamber extending downwardly into said vessel chamber and having an elongated opening at the bottom of said terminal chamber which opening extends completely through said cover means, an electric heating means removably attached to said cover means within said terminal chamber and extending through said elongated opening into said vessel chamber for heating fluid disposed within said vessel chamber, said heating means being removable from said kettle while said cover means is assembled to said vessel.

3. The electric kettle of claim 2 wherein said cover means includes a cover and a handle member removably attached thereto for providing access to said terminal chamber.

4. The electric kettle of claim 3 including a cord storage chamber between said handle member and cover and spaced above said terminal and vessel chambers, an electric cord having a plug at one end and having the other end in electrical connection with said heating means, said cord extending into and storable within said cord chamber.

5. The electric kettle of claim 4 including means limiting the amount of said cord insertable within said terminal chamber.

6. The electric kettle of claim 3 wherein said cover and handle member are formed with integral means cooperating to lock an electric cord which is in electrical connection with said heating means whereby a pulling force exerted upon said cord outside of said kettle is not transmitted to the connection between said cord and heating means.

7. The electric kettle of claim 2 wherein said heating means being L-shaped with a vertical leg extending to near the bottom of said vessel and a substantially horizontal leg for producing substantially all of the heat generated by said heating means, said horizontal leg closely spaced to the bottom of said vessel.

8. The electric kettle of claim 7 wherein said heating means being sufficiently narrow for passing through said cover means opening.

9. The electric kettle of claim 2 wherein said heating means including an upwardly open cup-shaped well which readily transmits heat extending downwardly into said vessel chamber and an electric heater which extends to near the bottom of said vessel, a portion of said heater being in intimate heating transmitting engagement with said well, a thermostat control for controlling the energizing of said heater disposed within said well and positioned to react quickly to the heat transmitted to said well by said heater portion.

10. The electric kettle of claim 9 wherein said thermostat control and heater portion are both in engagement with the bottom of said well.

11. The electric kettle of claim 10 wherein said heater portion being bonded rigidly to the bottom of said well, means biasing said thermostat control to the bottom of said well whereby said heater portion and said thermostat control are in good thermal transmitting relationship.

12. The electric kettle of claim 10 wherein said heater portion is approximately equidistant from the ends of said electric heater.

13. An electric kettle comprising a vessel, a cover means attached to the top of said vessel and forming a vessel chamber for holding a fluid, an electric heating means secured to said cover means for heating the fluid in said vessel chamber, said electric heating means including an electric heater which extends to near the bottom of said vessel chamber and thermostat control means for controlling the flow of electrical current to said heater, said thermostat control means being in good thermal transfer relationship with a portion of said heater, said heater having a vertical leg extending from said cover means to adjacent the bottom of said vessel chamber and a generally horizontal leg disposed near the bottom of said vessel chamber, said heater adapted for producing most of its heat in said horizontal leg, said thermostat control means including a well depending within said vessel chamber to said horizontal heater leg and a thermostat disposed within and against said well, said horizontal heater leg containing said portion which is in good thermal transfer relationship engagement with said well.

14. The electric kettle of claim 13 wherein said well includes a bottom wall, spring means biasing said thermostat against said bottom wall and said heater portion metallurgically attached to said bottom wall immediately adjacent to said thermostat.

15. The electric kettle of claim 13 wherein said horizontal heater leg has a general W-shaped configuration wherein the bight portion is the portion in engagement with said well and the outer segments thereof are relatively closely spaced together so that said electric heating means can pass through an opening in said cover means whereby said heater can be moved from said vessel chamber without said cover means being removed from said vessel.

16. The electric kettle of claim 13 wherein said thermostate control means includes a mounting plate secured to said cover means, a well attached to said plate and depending into said vessel chamber, a thermostat disposed at the bottom of said well, an insulating member within said well above said thermostat for locating said thermostat and holding it in good thermal conducting relationship with the bottom of said well, spring means connected to said mounting plate biasing said insulating member downwardly against said thermostat.

17. An electric kettle comprising an upwardly open cup-shaped vessel, a plastic cover disposed over said vessel opening to define a vessel chamber therebetween, electrical heating means connected to said cover and depending into said vessel chamber, said vessel opening defined by an annular rim including an inwardly projecting shelf, said cover being molded with integral cam means depending into said vessel chamber, nut means engageable with said cam means and supported by fastener means which passes through said cover and is supported thereby, said fastener means disposed for raising and lowering said nut means whereby said cam means being disposed to force said nut means when being raised by said fastener means outwardly so that said nut means abuts against the bottom of said shelf for locking said cover rigidly to said vessel and the lowering of said nut means releases said cover from said vessel, said cover forms a pouring spout leading outwardly from said vessel chamber, said cam means positioned below said spout and viewable through said spout, said spout constituting an inlet opening for filling said vessel chamber, said cam means depending into said vessel chamber to its maximum operating level to which said vessel should be filled whereby said cam means constitutes a fluid level gauge for visually indicating when the vessel chamber is filled to its maximum operating level.

18. An electric kettle comprising a cup-shaped vessel, fastening means securing a cover to the top of said vessel to define a vessel chamber therebetween for holding a fluid therein, a handle member secured to the top of said cover to define a cord storage chamber therebetween which is above said vessel chamber, said cover forming a terminal chamber depending into said vessel chamber and disposed below said cord storage chamber, electric heating means attached to said cover and extending from the bottom of said terminal chamber into said vessel chamber, an electric power cord means extending into said cord storage chamber and extending into said terminal chamber for making an electrical connection with said electric heating means, said cover is molded from plastic material and formed with an integral spout leading to said vessel chamber for pouring fluid from said vessel chamber and providing access to said vessel chamber for filling, said fastening means disposed adjacent said spout and viewable therethrough, said fastening means depending into said vessel chamber to a level for maximum filling for proper operation of said kettle whereby said fastening means constituting a visual sight gauge for filling said vessel to the maximum operating level.

19. An electric kettle comprising a cup-shaped vessel, fastening means securing a cover to the top of said vessel to define a vessel chamber therebetween for holding a fluid therein, a handle member secured to the top of said cover to define a cord storage chamber therebetween which is above said vessel chamber, said cover forming a terminal chamber depending into said vessel chamber and disposed below said cord storage chamber, electric heating means attached to said cover and extending from the bottom of said terminal chamber into said vessel chamber, an electric power cord means extending into said cord storage chamber and extending into said terminal chamber for making an electrical connection with said electric heating means, said heating means depends to near the bottom of said vessel chamber and is releasably attached at the bottom of said terminal chamber, said cover defining an opening in the bottom of said terminal chamber through which said heating means extends, said heating means being removable from said vessel chamber through said terminal and cord storage chambers.

(References on following page)

References Cited

UNITED STATES PATENTS

| | | | |
|---|---|---|---|
| 1,198,166 | 9/1916 | Stoddard. | |
| 1,599,558 | 9/1926 | Diehl | 174—175 X |
| 2,027,537 | 1/1936 | Kircher | 219—437 |
| 2,242,503 | 5/1941 | Baule. | |
| 2,489,560 | 11/1949 | Brown | 219—441 |
| 2,801,324 | 7/1957 | Ware | 219—336 |
| 2,929,908 | 3/1960 | Parker et al. | 219—437 |
| 3,003,018 | 10/1961 | Cook | 174—135 X |
| 3,092,134 | 6/1963 | Allen et al. | 174—135 X |

FOREIGN PATENTS

| | | |
|---|---|---|
| 969,084 | 5/1950 | France. |

JOSEPH V. TRUHE, Primary Examiner

M. C. FLIESLER, Assistant Examiner

U.S. Cl. X.R.

174—135; 219—435, 441